INVENTORS
B. F. WILEY
E. L. CLARK
BY Hudson & Young
ATTORNEYS

April 17, 1956 B. F. WILEY ET AL 2,741,916
FLOWMETER
Filed April 6, 1953 5 Sheets-Sheet 2
FIG. 2a
FIG. 2b
FIG. 2c
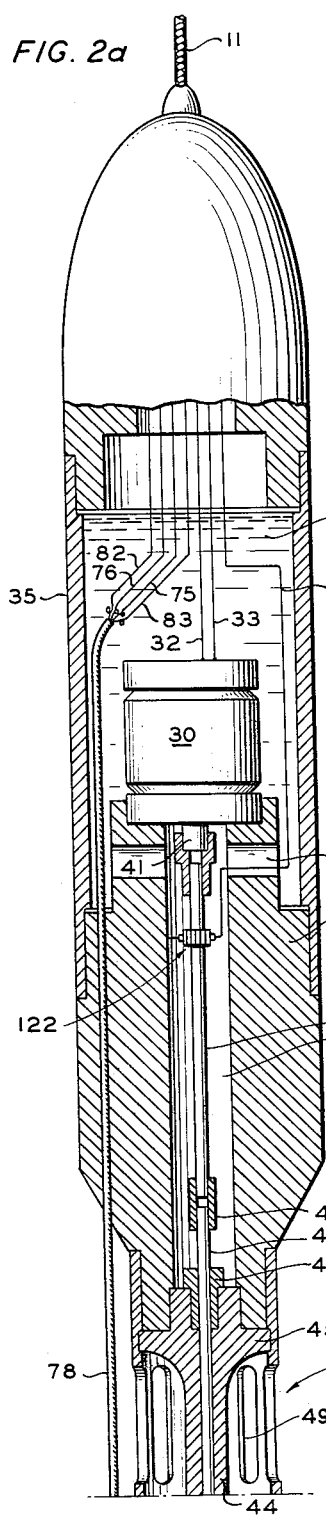
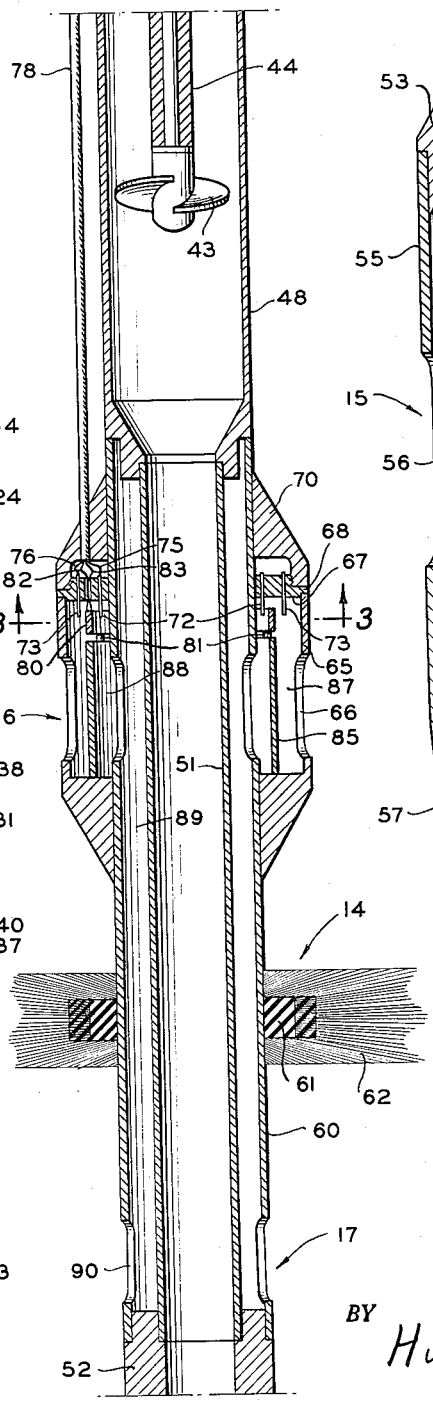
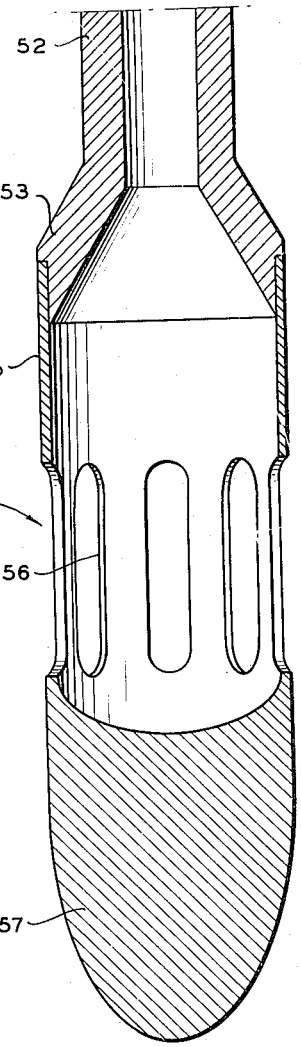
INVENTORS
B. F. WILEY
E. L. CLARK
BY Hudson & Young
ATTORNEYS

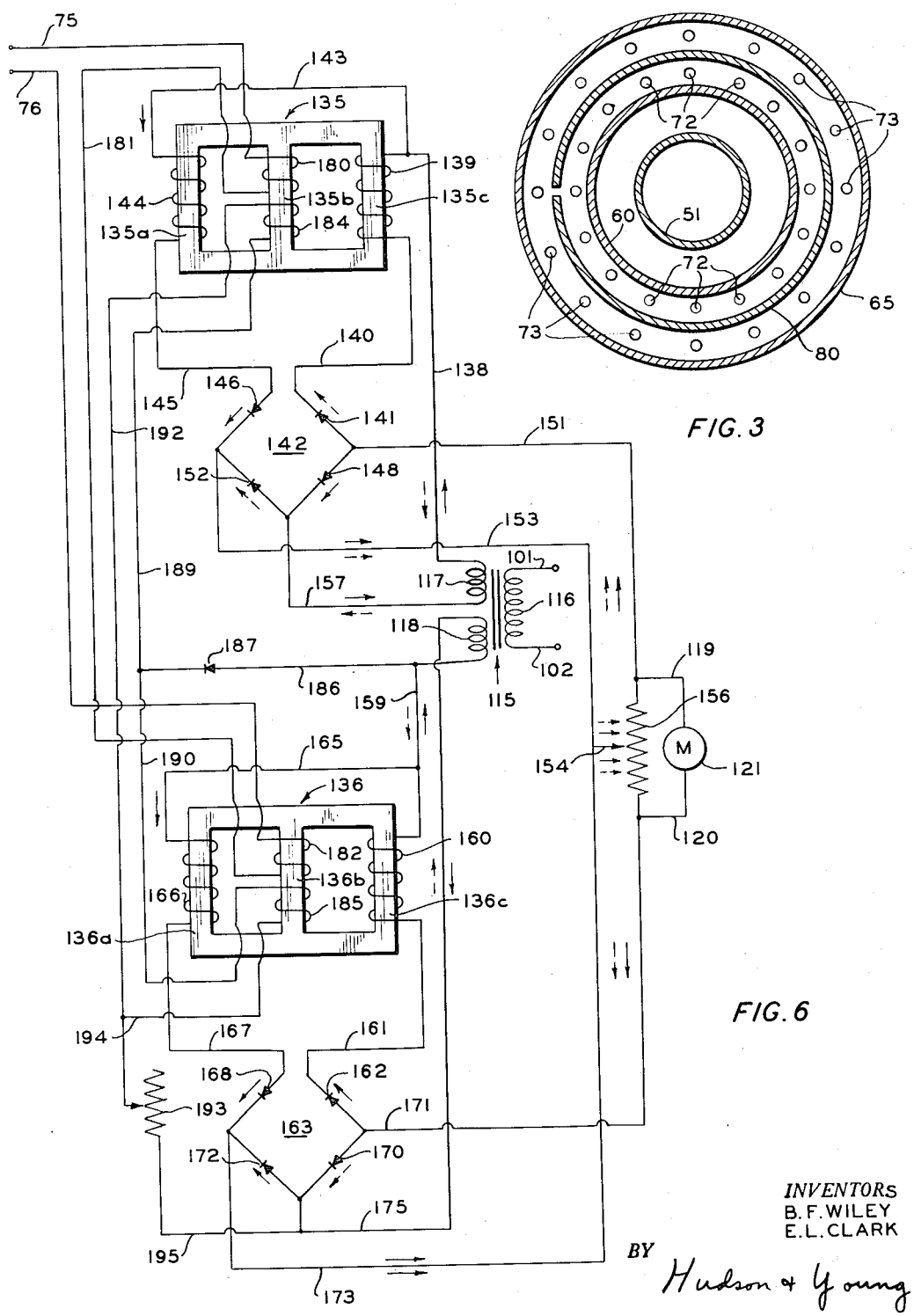

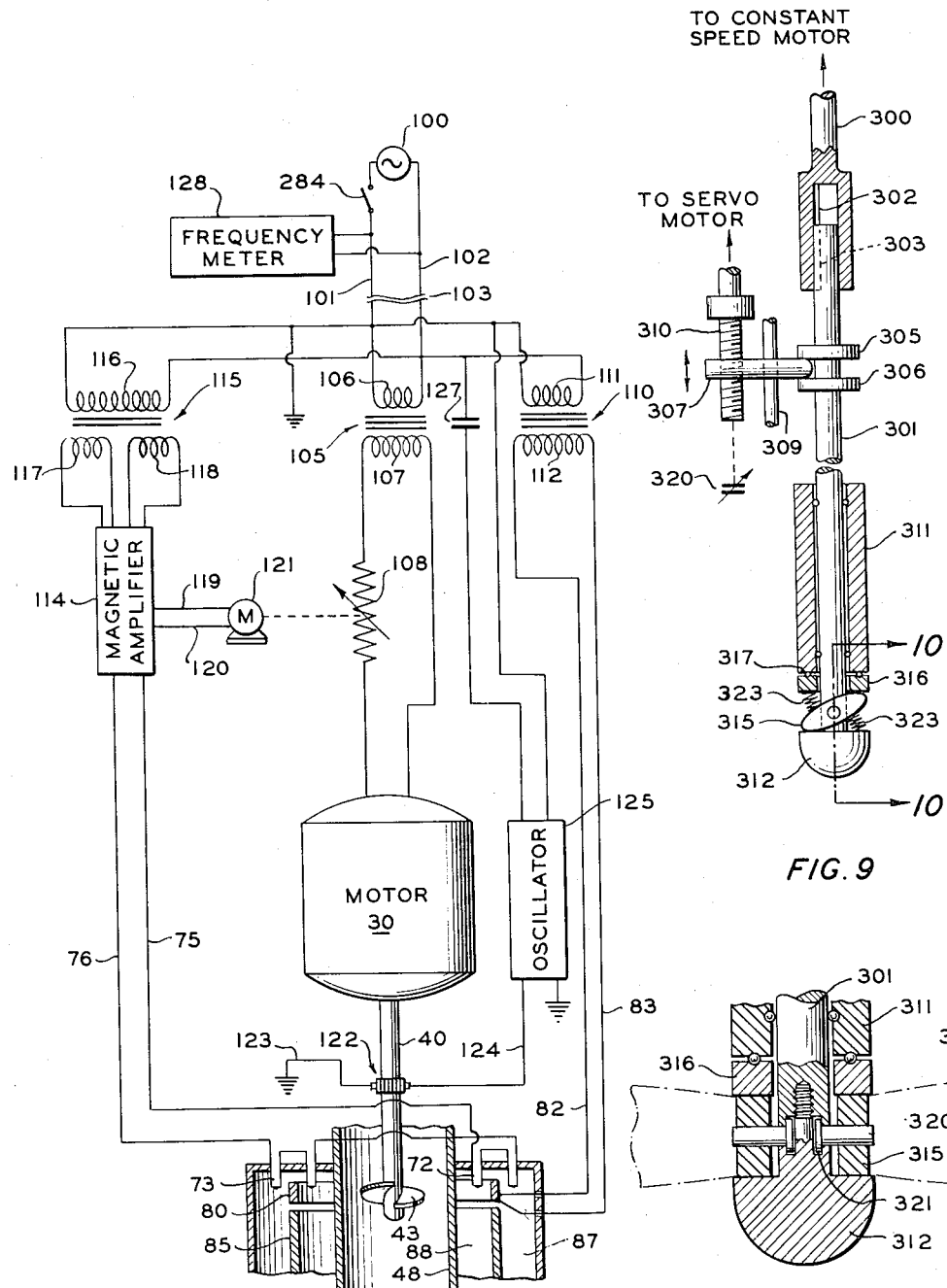

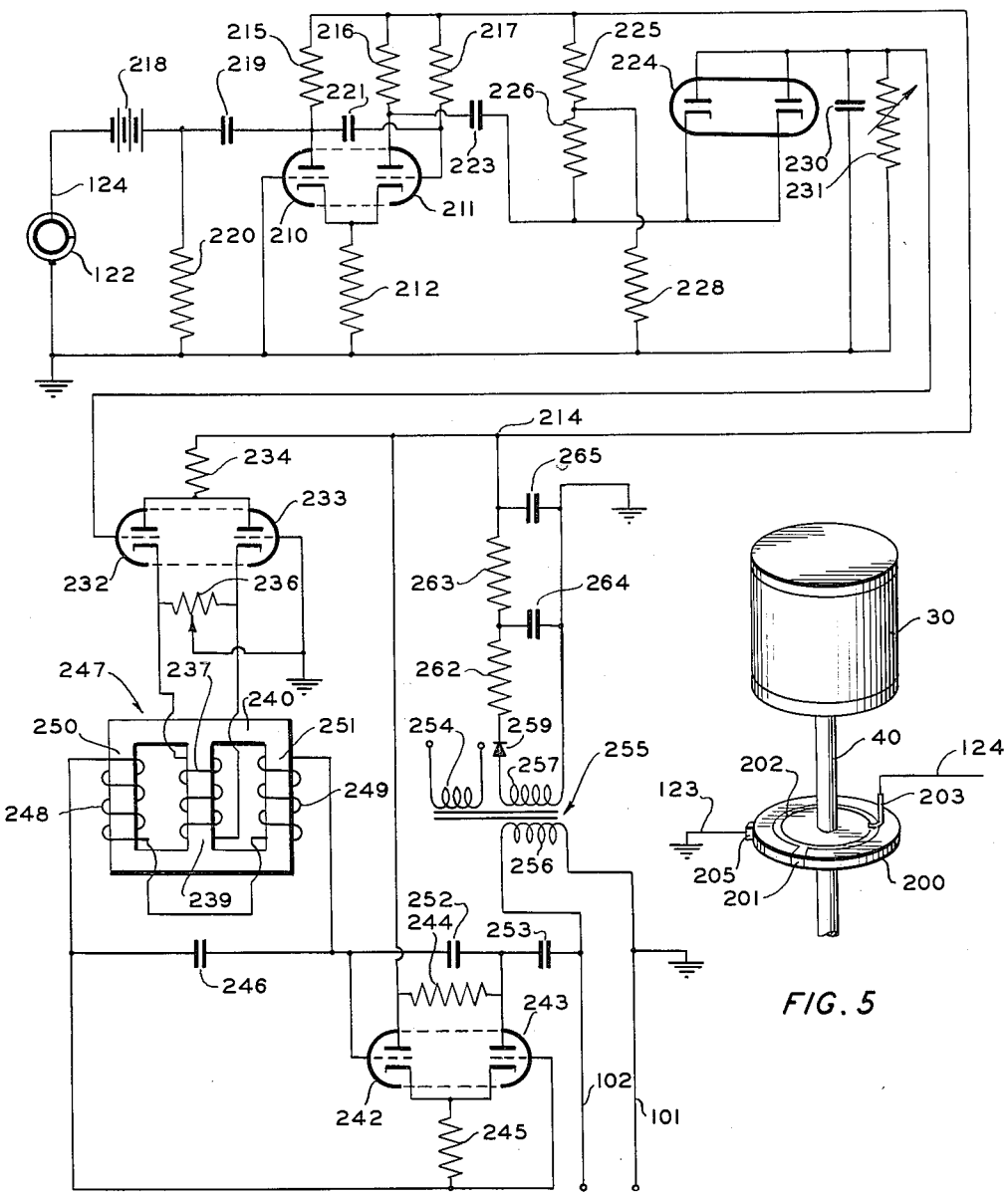

United States Patent Office 2,741,916
Patented Apr. 17, 1956

2,741,916

FLOWMETER

Bruce F. Wiley and Ernest L. Clark, Bartlesville, Okla., assignors to Phillips Petroleum Company, a corporation of Delaware Application April 6, 1953, Serial No. 346,956

18 Claims. (Cl. 73—155)

This invention relates to flowmeters. In another aspect it relates to apparatus for measuring fluid flow within bore holes. In another aspect it relates to apparatus for determining the rate fluid is injected from a bore hole into adjacent earth formations. In still another aspect it relates to electrical circuits for operating flowmeters disposed in inaccessible locations and for telemetering information to a second location.

In certain oil producing operations it has been found desirable to inject fluids through a bore hole into adjacent earth formations. This is particularly true in water flooding oil recovery systems wherein water is pumped into a selected bore hole, wherefrom it enters adjacent formations to force oil which may be deposited therein into a nearby producing well. It is desirable to determine the rate fluid is injected into the various formations in order to control the rate at which oil is forced through these formations. One method that has been employed heretofore to measure the rate of flow into these formations has been to position a conventional flowmeter at different depths within the bore hole to measure the total flow therepast. However, this procedure requires a previous caliper survey of the bore hole in order that the flowmeter readings can be calibrated for varying diameters of the bore hole. Even then this procedure has not been entirely satisfactory because water often accumulates in cavities which results in erroneous flow readings.

In accordance with the present invention there is provided a simplified flow measuring system which utilizes a pair of parallel flow paths, each of which communicates between bore hole regions on opposite sides of a packing device. The first flow path is provided with a thermocouple type flowmeter adapted to indicate the direction and rate of fluid flow through the first path. The second flow path contains a motor-driven impeller which measures the rate of fluid flow through the second path. A servo system including a magnetic amplifier is connected to the output signal from the thermocouple flowmeter. This system varies the rate of fluid pumped by the impeller so as to maintain a null flow through the first flow path. The rate of flow through the second path is proportional to the rate of rotation of the motor-driven impeller. Electrical circuits are provided for operating the entire system within a bore hole and for telemetering the indicated flow rate through the second path to suitable surface equipment.

Accordingly, it is an object of this invention to provide improved apparatus for measuring fluid flow rates.

Another object is to provide apparatus for determining at the surface of a bore hole the rate of fluid flow from the bore hole into adjacent earth formations.

A further object is to provide a flow measuring system adapted to be disposed in an inaccessible location together with electrical circuits for operating the system from a second location spaced therefrom whereby the information obtained at the inaccessible location is telemetered to the second location.

A still further object is to provide apparatus for carrying out the above-mentioned objects which is of rugged construction, simple to operate, capable of giving accurate readings and which utilizes a minimum number of connecting electrical leads.

Various other objects, advantages and features of this invention should become apparent from the following detailed description taken in conjunction with the accompanying drawing in which:

Figure 1 illustrates the water injectivity pumping and metering apparatus positioned within a bore hole;

Figures 2a, 2b and 2c, collectively, are vertical sectional views of the apparatus of Figure 1;

Figure 3 is a sectional view taken along line 3—3 in Figure 2b;

Figure 4 is a schematical view illustrating the electrical components of the flow measuring system disposed within the bore hole and at the surface;

Figure 5 is a view of the impeller speed indicator switch;

Figure 6 is a schematic electrical circuit diagram of the magnetic amplifier illustrated in Figure 4;

Figure 7 is a schematic electrical circuit diagram of the variable frequency oscillator transmitter employed to measure the speed of rotation of the motor-driven impeller;

Figure 9 is a schematic view of a modified form of variable speed motor-driven impeller; and Figure 10 is a sectional view taken along line 10—10 in Figure 9.

Figures 1, 8:
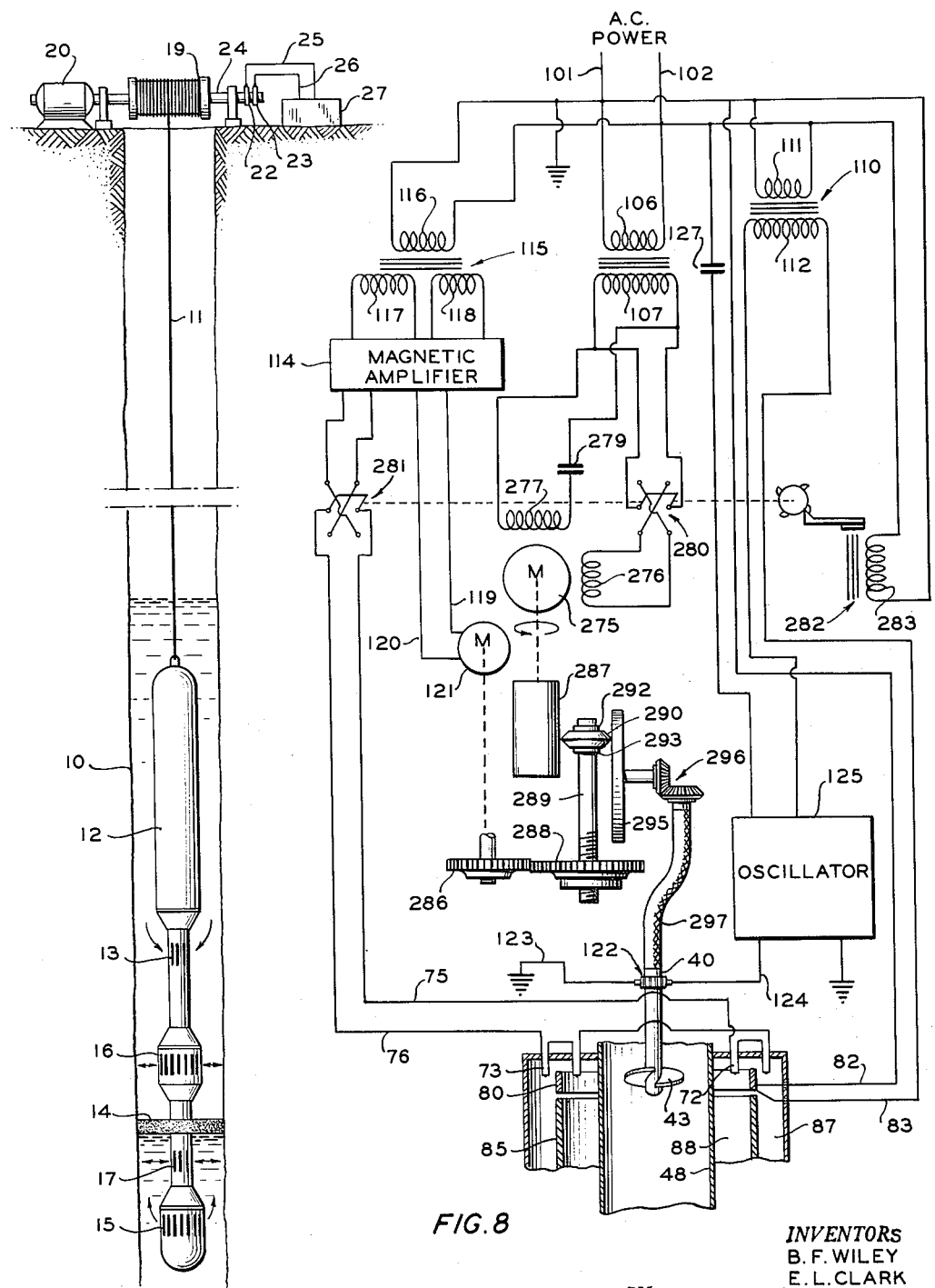
Figure 8 is a schematic view of a modified form of the flowmeter control system adapted to measure flow in either direction through the bore hole.

Suitable metering apparatus for use in water injectivity flow measuring operations is illustrated in Figure 1 of the drawing. This apparatus, which is supported within a section of a bore hole 10 by a cable 11, includes a motor-pump assembly 12 which pumps a measurable quantity of fluid from an inlet 13 positioned above a packing device 14 to an outlet 15 below packing device 14. A second by-pass flow path is provided by an interior passage which communicates between an opening 16 above packing device 14 and an opening 17 below packing device 14. This last-mentioned by-pass flow path has a thermocouple flowmeter disposed therein to indicate flow therethrough. When water passes out through outlet 15 at a rate equal to the rate at which it enters the adjacent earth formation below packer 14 there is no flow in either direction through the passage connecting openings 16 and 17 and, accordingly, there is no pressure differential across packer 14. At this condition of zero flow through the by-pass flow path the rate of flow through the passage connecting openings 13 and 15 is the rate at which water is being pumped into the earth formation below packer 14. This arrangement eliminates the need of an absolutely fluid-tight packer which is difficult to provide.

The upper end of cable 11 is attached to a rotatable reel 19 which is driven by a suitable motor 20. Cable 11 contains a pair of electrical leads 101 and 102, not shown in Figure 1, which terminate in respective slip rings 22 and 23 mounted on the drive shaft 24 which rotates reel 19. Electrical leads 25 and 26 engage respective slip rings 22 and 23 to connect the two leads contained within cable 11 to the surface indicating apparatus indicated at 27. The electrical components contained within the flow measuring assembly supported in the bore hole and in unit 27 are described hereinafter.

The detailed construction of the flowmetering apparatus is illustrated in Figures 2a, 2b and 2c. Motor-pump assembly 12 includes a motor 30 positioned at the upper end of an annular block 31 in a hollow chamber 34 formed in casing 35. Chamber 34 preferably is filled with an insulating liquid such as oil and pressure adjusting bellows, not shown, can be attached to the wall of casing 35 if desired. Motor 30 is operated from a source of electrical energy positioned at the surface of the bore hole through the two power leads contained within cable 11. Leads 32 and 33 serve to connect motor 30 with these power leads.

An axial passage 37 in annular member 31 communicates with chamber 34 through a plurality of openings 38 and contains a coupling rod 40 which connects the drive shaft 41 of motor 30 to a second rod 42 which supports a pump impeller 43 at the lower end thereof. Rod 42 is contained within a sleeve member 44 having an integral flanged head 45 abutting annular member 31 and carrying a bearing 46 for rod 42. Rods 40 and 42 are interconnected by a coupling device 47. Impeller 43 is housed within a tube 48 which is secured to annular member 31 at its upper end and which is provided with openings 49 near its upper end forming inlet 13. The lower end of tube 48 is joined to a smaller diameter tube 51 which is connected at its lower end to a tubular member 52 having a flared lower portion 53 which receives an enlarged cylindrical discharge unit 55. Unit 55 is provided with openings 56 defining outlet 15 and is formed with an integral weighted member 57 which maintains the apparatus in vertical alignment within the bore hole. Mounted concentrically with tube 51 is a larger diameter tube 60 carrying a packing device 14. Packer 14 can be of any desired construction but preferably is formed of an annular hard rubber sleeve 61 carrying a plurality of radially extending bristles 62 which engage the wall of the bore hole in fluid-tight arrangement. Bristles 62 are impregnated with a suitable sealing compound such as grease.

The thermocouple flowmeter assembly employed to indicate liquid flow between openings 16 and 17 is mounted within a generally cylindrical casing 65 having openings 66 forming opening 16. The base of casing 65 is secured to tube 60. An annular plate 67 is positioned about tube 60 and is formed with a flanged portion 68 which fits upon the upper end of casing 65. A cap 70 is threaded to the upper side of plate 67 and engages tube 60. In this manner plate 67 is carried by tube 60 in a position generally perpendicular to the axis of tube 60, that is, in a horizontal position when the flowmeter is suspended in the bore hole. Plate 67 carries an inner set of first thermocouple junctions 72 and an outer set of second thermocouple junctions 73, each junction being suspended from plate 67 and electrically insulated therefrom. With reference to Figure 3 it can be seen that both sets of thermocouple junctions are arranged in generally circular formation about the flowmeter axis. The number of thermocouple junctions employed is not critical although the sensitivity of the apparatus is, of course, increased by a large number of junctions. Each set of junctions is connected in series, as illustrated in greater detail in Figure 4, and a pair of terminal leads 75 and 76 pass through a hollow conduit 78 which extends between cap 70 and annular member 31 in closely spaced relation with tube 48.

A metal ring or heating element 80 is positioned between the sets of thermocouple junctions 72 and 73. The upper surface of this element is held in closely spaced relation to the lower surface of plate 67 by a plurality of insulating supports, one of which is shown at 81. Ring 80 has sufficiently high electrical resistance to produce a substantial heating effect when electric current is passed therethrough by means of connecting leads 82 and 83. Leads 82 and 83 also pass upward through conduit 78 and are connected to the surface components as illustrated in greater detail in Figure 4. The lower end of casing 65 supports a cylindrical sleeve 85 which is mounted concentric with heating ring 80. In this manner fluid entering opening 16 passes upward through passage 87, horizontally inward past heating ring 80 and then downward through a passage 88 into the passage 89 contained between tube 60 and tube 51. The fluid finally passes outward through openings 90 in tube 60 which defines opening 17.

The operation of the flow metering system of this invention can be explained in conjunction with Figure 4 wherein the electrical circuitry employed to operate the system within a bore hole is illustrated in a schematic manner. A source of alternating potential 100 is positioned at the surface and connected with the downhole portion of the apparatus by means of power leads 101 and 102 which are contained within cable 11. If desired lead 101 can be the grounded cable casing. The components illustrated above line 103 are positioned at the surface and the components illustrated below line 103 are positioned within the bore hole. A transformer 105 is connected with its primary winding 106 across power leads 101 and 102. The secondary winding 107 of transformer 105 is connected in series relation with motor 30 and a variable resistor 108. Heating current for ring 80 is supplied by a transformer 110 having its primary winding 111 connected across power leads 101 and 102. The secondary winding 112 of transformer 110 is connected by leads 82 and 83 to heater ring 80. The inner and outer thermocouple junctions 72 and 73, respectively, are connected in series relation and the output terminals thereof are connected by leads 75 and 76 to a magnetic amplifier circuit 114. Operating current for magnetic amplifier 114 is supplied by a transformer 115 having its primary winding 116 connected across power leads 101 and 102. A pair of secondary windings 117 and 118 of transformer 115 supply energy to magnetic amplifier 114. The output signal from amplifier 114 is connected by leads 119 and 120 to a direct current reversible motor 121 having a permanent magnetic field. The output rotation of motor 121 is coupled mechanically to the arm of variable resistor 108 so as to vary the effective resistance thereof. An interrupter switch 122 is attached to drive shaft 40 of motor 30. One terminal of switch 122 is grounded by a lead 123 and the second terminal thereof is connected to a variable frequency oscillator unit 125 by a lead 124, the second input terminal of oscillator 125 is grounded. The output of oscillator 125 is applied through a capacitor 127 to power leads 102 and 101. The variable frequency output signal of oscillator 125 is detected at the surface by a frequency meter 128 which is connected across power leads 101 and 102.

The purpose of switch 122, oscillator 125 and meter 128 is to provide an indication of the speed of rotation of impeller 43, which in turn provides an indication of the rate at which the fluid passes through the interior passage between inlet 13 and outlet 15. With reference to Figure 1, which is considered to represent a water injectivity well, water is passed downward into bore hole 10 from the surface either by gravity flow or by pumping means, not shown. The flowmeter assembly is lowered into the well to provide an indication of the downward flow at any given level. In operation the total flow from the region above packer 14 to the region therebelow is equal to the sum of the flow through the passage communicating between openings 13 and 15 and the passage communicating between openings 16 and 17. If there is zero flow between openings 16 and 17 it is known that the total flow past the packer is equal to the flow between openings 13 and 15, and this flow in turn is measured by the speed of rotation of impeller 43.

In operation, heating current is supplied to ring 80. With zero flow through the passage between openings 16 and 17 there is zero flow past ring 80 and consequently the heat radiated therefrom tends to warm both sets of thermocouple junctions 72 and 73 by like amount. Thus, there is no temperature difference between these two sets of junctions and no output voltage is developed between leads 75 and 76. If, however, fluid should flow through the passage interconnecting openings 16 and 17 the inner junctions 72 of the thermocouple are heated because water passing horizontally past ring 80 from passage 87 to passage 88 is warmed by ring 80. This produces a temperature differential between the two sets of thermocouple junctions which generates an output voltage between leads 75 and 76. Such voltage difference provides an input signal to amplifier 114 such that the amplifier output signal therefrom causes rotation of motor 121 and subsequent movement of the arm of variable resistor 108. The direction of this movement is such that the resistance in circuit with motor 30 is reduced to increase the speed of motor 30. This results in faster rotation of impeller 43 such that there is an increased flow of fluid between passages 13 and 15. The increased flow between passages 13 and 15 results in decreased flow between passages 16 and 17, with the adjustment of resistor 108 continuing until the latter flow is reduced to zero. If, on the other hand, there is a flow upward between openings 17 and 16 the outer set of thermocouple junctions 73 becomes warmer than the inner set of junctions 72. This creates a potential difference between leads 75 and 76 of polarity opposite that previously mentioned whereby motor 121 is rotated in the opposite direction to increase the resistance of resistor 108 which slows down motor 30 until there is once again a zero flow between passages 17 and 16. Thus, the flow measuring system operates in an automatic and continuous manner to maintain zero flow through the bypass flow path between passages 16 and 17. As long as this zero flow condition is maintained the flow through the main impeller path represents the total flow past packer 14, and this flow is indicated by the speed of rotation of impeller 43 as measured by meter 128 in a manner which is described in greater detail hereinafter.

The magnetic amplifier 114 employed to energize motor 121 in response to the thermocouple output is illustrated schematically in Figure 6. This amplifier comprises a pair of like constructed saturable magnetic core reactors 135 and 136. Reactor 135 is provided with three parallel arms 135a, 135b and 135c and reactor 136 is provided with three parallel arms 136a, 136b and 136c. The alternating current supply voltages to these two reactors 135 and 136 are provided by respective windings 117 and 118 of transformer 115. A lead 138 is connected to one terminal of transformer winding 117 and to one terminal of a winding 139 on arm 135c of reactor 135. The second terminal of winding 139 is connected by a lead 140 to one terminal of a rectifier 141 forming an arm of a rectifier bridge circuit 142. A lead 143 is connected between lead 139 and one terminal of a winding 144 on arm 135a. A lead 145 is connected to the second terminal of winding 144 and to one terminal of a second rectifier 146 of unit 142. The second terminal of rectifier 141 is connected directly to the first terminal of a third rectifier 148 of unit 142 and to one terminal of an output resistor 156 by a lead 151. The second terminal of rectifier 146 is connected to the first terminal of a fourth rectifier 152 of unit 142 and through series-connected leads 153 and 154 to an adjustable contactor engaging resistor 156. The second terminals of rectifiers 148 and 152 are interconnected and the common junction therebetween is connected by a lead 157 to the second terminal of transformer winding 117.

A lead 159 is connected to one terminal of transformer winding 118 and one terminal of a winding 160 on arm 136c of reactor 136. The second terminal of the winding 160 is connected by a lead 161 to one terminal of a rectifier 162 forming an arm of a rectifier bridge circuit 163. A lead 165 is connected between lead 159 and one terminal of a winding 166 on arm 136a. A lead 167 is connected to the second terminal of winding 166 and to one terminal of a second rectifier 168 of unit 163. The second terminal of rectifier 162 is connected directly to the first terminal of a third rectifier 170 of unit 163 and to one terminal of output resistor 156 by a lead 171. The second terminal of rectifier 168 is connected to the first terminal of a fourth rectifier 172 of unit 163 and through series-connected leads 173 and 154 to the adjustable contactor engaging resistor 156. The second terminals of rectifiers 170 and 172 are interconnected and the common junction therebetween is connected by a lead 175 to the second terminal of transformer winding 118. Motor 121 is connected across the end terminals of resistor 156 by leads 119 and 120.

The output signal from the thermocouple unit supplies a direct current control voltage for the two saturable reactors. Lead 75 is connected to the first terminal of a winding 180 mounted on arm 135b of reactor 135, and the second terminal of winding 180 is connected by a lead 181 to the first terminal of a winding 182 mounted on arm 136b of reactor 136. The second terminal of winding 182 is connected to lead 76. The two windings 180 and 182 are reversed on respective arms 135b and 136b whereby an output signal of given polarity from the thermocouple unit provides flux of equal magnitude but opposite direction in the two arms 135b and 136b. Windings 184 and 185 are mounted on respective arms 135b and 136b to provide a bias flux in the two reactors. A lead 186 is connected between one end terminal of transformer winding 118 and a first terminal of a rectifier 187. The second terminal of rectifier 187 is connected by a lead 189 to the first terminal of winding 184 and by a lead 190 to a first terminal of winding 185. The second end terminal of winding 184 is connected by a lead 192 to the contactor of a potentiometer 193 and the second end terminal of winding 185 also is connected by a lead 194 to the contactor of potentiometer 193. The end terminal of potentiometer 193 is connected by a lead 195 to the second terminal of transformer winding 118 thereby completing the circuit for the bias windings. These two bias windings 184 and 185 are wound in like direction on respective arms 135b and 136b in order to saturate the respective reactors by a predetermined amount.

For purposes of explaining the operation of this magnetic amplifier it is first assumed that the output signal from the thermocouple unit is zero, which results in no current flow through either of the control windings 180 and 182. During a first half cycle of applied voltage to winding 116 of transformer 115 current flow takes place in the amplifier circuit as indicated by the solid arrows. In the circuit associated with reactor 135 current flows from transformer winding 117 through lead 138, lead 143, winding 144, lead 145, rectifier 146, lead 153, lead 154, the upper portion of resistor 156, lead 151, rectifier 148, and finally back to transformer winding 117 through lead 157. The current flow through the circuit associated with reactor 136 is from winding transformer 118 through lead 175, rectifier 172, lead 173, lead 154, the lower portion of resistor 156, lead 171, rectifier 162, lead 161, winding 160, and finally back to transformer winding 118 through lead 159. During the second half cycle of applied voltage the current flow through the amplifier circuit is as indicated by the broken line arrows. In the circuit associated with reactor 135 this current flow is from transformer winding 117 through lead 157, rectifier 152, lead 153, lead 154, the upper portion of resistor 156, lead 151, rectifier 141, winding 139, and finally back to transformer winding 117 through lead 138. The current flow through the circuit associated with reactor 136 is from transformer winding 118 through lead 159, lead 165, winding 166, lead 167, rectifier 168, lead 173, lead 154, the lower portion of resistor 156, lead 171, rectifier 170, and finally back to transformer winding 118 through lead 175. It should be noted that during both half cycles of applied voltage current flows in opposite direction through the two half portions of resistor 156. If the two reactor circuits are symmetrical and if the contactor of resistor 156 is positioned at the midpoint thereof, there is no potential difference between the two end terminals of resistor 156 and consequently motor 121 remains stationary.

If the output signal from the thermocouple unit provides a potential difference between leads 75 and 76 of first polarity there is a current flow through the windings 180 and 182 of the two reactors. This direct current flow is such as to increase the flux in one reactor and decrease the flux in the other. Under this condition the two circuits are no longer symmetrical which results in unequal current flow through the two portions of resistor 156 such that there is a potential difference between leads 119 and 120 which rotates motor 121 in a first direction. If a potential difference of opposite polarity is applied between leads 75 and 76 the total flux is increased in one reactor and decreased in the other in a manner opposite to that previously mentioned such that there results a potential difference between leads 119 and 120 of polarity opposite that previously mentioned whereby motor 121 rotates in a second direction. This reversal of polarity in the input signal is accomplished by means of the bias winding which establishes the degree of magnetic saturation in the two reactors at a predetermined level. A current flow through the control windings results in either an increase in flux above this predetermined level or a decrease in flux below this level depending upon the particular direction of the control current. Accordingly, the magnetic amplifier illustrated herein provides a simple method of converting a small direct voltage into an amplified voltage for driving servo motor 121 to adjust resistor 108. This magnetic amplifier is particularly useful for operations within a bore hole because of the simplicity of the circuit and its compact, rugged nature. While the particular amplifier circuit illustrated is the present preferred circuit for use with this invention it should readily be apparent that other magnetic amplifiers can be employed if desired.

As previously mentioned switch 122, oscillator 125 and frequency meter 128 are employed to measure the speed of rotation of impeller 43. Switch 122 is illustrated in detail in Figure 5 as comprising a rotatable disc 200 mounted on drive shaft 40 so as to revolve therewith. Disc 200 is constructed of electrical insulating material, but is provided with a sector 201 of electrical conductive material. Sector 201 is connected to an annular ring 202 of electrical conductive material which is disposed on the upper surface of disc 200 so as to make continuous contact with a brush 203, the latter having lead 125 connected thereto. A second brush 205 makes continuous contact with the periphery of disc 200 and with sector 201 once during each revolution of shaft 40. Brush 205 is connected to ground whereby lead 124 is grounded momentarily once during each revolution of the impeller 43.

A tachometer oscillator 125, which is illustrated in detail in Figure 7, is employed to generate a signal, the frequency of which is proportional to the speed of rotation of impeller 43. This tachometer oscillator circuit includes a one shot multivibrator to provide a uniform shaped output pulse for each negative pulse applied thereto; a rectifier; an integrating circuit; a variable inductor, the inductance of which is proportional to the magnitude of the integrated voltage; and an oscillator, the frequency of which is governed by the inductor.

The multivibrator includes a pair of triodes 210 and 211 having their cathodes grounded through a common resistor 212. The anodes of triodes 210 and 211 are connected to a positive potential terminal 214 through respective resistors 215 and 216. The control grid of triode 210 is connected directly to ground and the control grid of triode 211 is connected to positive potential terminal 214 through a resistor 217. Lead 124 is connected to the negative terminal of a voltage source 218, the positive terminal of which is connected through a capacitor 219 to the anode of triode 210. The positive terminal of voltage source 215 also is connected to ground through a resistor 220. The anode of triode 210 is connected to the control grid of triode 211 through a capacitor 221 and the anode of triode 211 is connected through a capacitor 223 to the cathodes of a double diode rectifier tube 224.

A pair of series-connected resistors 225 and 226 are connected between positive terminal 214 and the cathodes of tube 224, and a resistor 228 is connected between ground and the junction between resistors 225 and 226. The two anodes of tube 224 are connected to ground through a capacitor 230 which is shunted by a variable resistor 231, these last two elements forming the integrating circuit.

The anodes of tube 224 also are connected to the control grid of a triode 232. The anode of triode 232 is connected to the anode of a second triode 233 and the two anodes are connected to positive potential terminal 214 through a common resistor 234. The control grid of triode 233 is connected directly to ground. The cathodes of triodes 232 and 233 are connected to the respective end terminals of a potentiometer 236, the contactor of which is connected to ground. The end terminals of potentiometer 236 are connected to the respective end terminals of a winding 237 mounted on the center arm 239 of a three arm saturable core magnetic reactor 240.

The operation of the electrical circuitry thus far described can be explained in the following manner. The voltage dividing network including resistors 225, 226 and 228 is proportioned to maintain a sufficient positive potential on the cathodes of tube 224 to prevent any conduction therethrough during normal operation. The grounding of conductor 124 through switch 122, however, momentarily reduces the potential on the cathodes of tube 224 by a sufficient amount that conduction takes place for a short time interval following each pulse. The one shot multivibrator is utilized to shape the input pulses to provide an output pulse of constant magnitude regardless of the magnitude of the input pulse applied to the anode of triode 210. Triode 211 normally is conducting while triode 210 is maintained at cut-off. A negative pulse applied through capacitors 219 and 221 lowers the potential on the control grid of triode 211 which decreases the current flow therethrough. This in turn lowers the potential on the cathodes of triodes 210 and 211 which allows triode 210 to become conducting, thereby further lowering the potential on the anode thereof and still further lowering the potential on the control grid of triode 211. At this point triode 211 becomes non-conducting, which condition is unstable, however, because the control grid of triode 211 is connected to positive potential terminal 214 through a high resistor 217 while the control grid of triode 210 is connected directly to ground. Immediately following the negative pulse being applied to the control grid of triode 211, condenser 221 is recharged through resistor 217, which causes triode 211 to become conducting once again and returns triode 210 to its original non-conducting condition. As triode 211 becomes conducting the potential on its anode is lowered. This results in a negative pulse being applied to the cathodes of tube 224, through capacitor 223, which thereby enables tube 224 to conduct until stability is restored to the multivibrator circuit. Once stability is restored tube 224 becomes non-conducting because of the positive potential maintained on the cathodes thereof through resistors 225, 226 and 228.

The negative pulses applied to the cathodes of tube 224 are thus of constant duration and magnitude, and these output pulses from tube 224 charge condenser 230 of the integrating circuit. In this manner the magnitude of potential applied to the control grid of triode 232 is representative of the frequency of pulses transmitted through switch 122. Triodes 232 and 233 and potentiometer 236 are connected in a bridge circuit. Any change in potential applied to the control grid of triode 232 varies the conduction therethrough in comparison with the conduction through triode 233. This change results in a difference in potential across the two end terminals of potentiometer 236 and consequently in a variance of current flow through the winding 237 on arm 239 of reactor 240.

The oscillator itself comprises a pair of triodes 242 and 243 having their respective anodes interconnected through a resistor 244. The cathodes of triodes 242 and 243 are connected to one another and to the control grid of triode 243 through a common resistor 245. The control grid of triode 243 is connected to the control grid of triode 242 through a tank circuit comprising a capacitor 246 and a variable inductor unit 247 connected in parallel relation. The variable inductor unit 247 comprises a pair of series-connected windings 248 and 249 which are mounted on respective arms 250 and 251 of reactor 240. The two windings 248 and 249 are wound in opposite direction whereby the fluxes generated by current flow through these individual series-connected windings are in opposite direction through arm 239. In this manner there is no alternating potential developed across winding 237 by current flow through windings 248 and 249. The control grid of triode 242 is connected to the anode of triode 243 through a capictor 252, and this anode in turn is connected to power lead 102 through a capacitor 253. As such the output oscillations are transmitted to the surface frequency meter 128 over power lead 102 and grounded lead 101. The frequency of the transmitted oscillations is determined by the variable inductance of unit 247 connected in parallel with capacitor 246. The inductance of this unit is in turn determined by the current flow through winding 237 which tends to saturate the reactor 240. Thus, an increase in current flow through winding 237 results in a decrease in inductance of the two series-connected windings 248 and 249 which varies the frequency of oscillations transmitted to the surface. In this manner the frequency of oscillations is proportional to the speed of rotation of impeller 43, and the frequency of such oscillations is indicated by meter 128.

Heater current for the filaments of the various vacuum tubes employed in the signal generator unit is supplied by the secondary winding 254 of a transformer 255, the primary winding 256 of which is connected across power leads 101 and 102. One end terminal of the second secondary winding 257 of transformer 255 is grounded and the second end terminal thereof is connected to one end terminal of a rectifier 259. The second end terminal of rectifier 259 is connected to power terminal 214 through series resistors 262 and 263. The junction between resistors 262 and 263 is connected to ground through a capacitor 264 and the junction between resistor 263 and terminal 214 is connected to ground through a capacitor 265. Resistors 262 and 263 and capacitors 264 and 265 thus form a filter for the output unidirectional current from rectifier 259 whereby a steady positive potential is maintained at terminal 214.

In Figure 8 there is illustrated a second embodiment of apparatus which can be employed both to vary the speed of rotation of impeller 43 in response to the indicated flow through the by-pass flow path and to reverse the direction fluid is pumped by impeller 43 when it is desired to operate the flow measuring apparatus to measure flow upward through the bore hole. The apparatus illustrated in Figure 8 is similar to that in Figure 4 in many respects and corresponding parts are designated by like reference numerals. The variable speed motor 30 illustrated in Figure 4 is replaced by a constant speed two-phase reversible induction motor 275. The two field windings of motor 275 are represented schematically by coils 276 and 277. Coil 277 is connected across the end terminals of transformer winding 107 through a capacitor 279 and coil 276 is connected across the end terminals of transformer winding 107 through a reversing switch 280. A reversing switch 281 is connected between the flow indicating thermocouple unit and magnetic amplifier 114 such that the polarity of input voltage applied to amplifier 114 by leads 75 and 76 can be reversed. Reversing switches 280 and 281 are mechanically coupled to one another and to a sequence relay 282 having an operating coil 283 connected across power leads 101 and 102. Relay 282 is operated at the surface by momentarily opening and closing switch 284, Figure 4. Relay 282 is thus actuated each time current supplied to the coil thereof is interrupted and restored. The drive shaft of servo-motor 121 is mechanically coupled to a first spur gear 286 and the drive shaft of motor 275 is connected to a cylinder 287 to cause rotation thereof about the axis of the cylinder. A second spur gear 288 engages gear 286 for rotation therewith and a threaded rod 289 is positioned axially with gear 288 and threaded thereto whereby rotation of gear 288 results in longitudinal movement of rod 289. A wheel 290 is mounted on rod 289 for rotation thereabout and a pair of flanges 292 and 293 are attached to rod 289 on opposite sides of wheel 290 to maintain wheel 290 in a fixed position on rod 289. Wheel 290 engages the periphery of cylinder 287 and is rotated thereby. A second wheel 295 is mounted adjacent wheel 290 such that the axes of the two wheels are mutually perpendicular. These two wheels are in engagement whereby rotation of cylinder 287 imparts rotation to wheel 295 through wheel 290. Rotation of gears 286 and 288 in response to the thermocouple output varies the relative position of wheel 290 between cylinder 287 and wheel 295. Since cylinder 287 rotates at a constant speed wheel 290 also rotates at a constant speed. The speed of rotation of wheel 295, however, depends upon the relative positioning between wheels 290 and 295, that is, when wheel 290 is positioned near the periphery of wheel 295 the latter is rotated relatively slowly whereas wheel 295 is rotated relatively rapidly when wheel 290 is positioned near the axis thereof. A set of beveled gears 296 serves to impart the rotation of wheel 295 to a flexible drive shaft 297 which is connected to shaft 40 which drives impeller 43.

The apparatus illustrated in Figure 8 functions to vary the speed of rotation of impeller 43 in substantially the same manner as previously described in conjunction with Figure 4. The output signal from the thermocouple unit is amplified and applied to servo-motor 121 which in turn varies the speed of rotation of impeller 43 through the variable speed coupling mechanism. If during the course of flow measuring operations it is desired to measure a flow in a direction upward through the well bore switch 284 is opened and closed to operate sequence relay 282 to reverse both switches 280 and 281. This provides a 180° phase reversal of the current flow through coil 276 which results in a reversal of the direction of rotation motor 275 and of impeller 43. At the same time switch 281 is reversed such that the output voltage from the thermocouple flowmeter unit also is reversed. Accordingly, the system operates in exactly the same manner as described above except that each effect previously mentioned is reversed. That is, a flow in the direction from opening 17 to opening 16 results in increased speed of rotation of impeller 43 to pass a greater amount of fluid upward from opening 15 to opening 13; and, conversely, a flow in the direction from opening 16 to opening 17 results in decreased speed of rotation of impeller 43 to pass a lesser amount of fluid upward from opening 15 to opening 13.

In Figures 9 and 10 there is illustrated a third embodiment of apparatus adapted to vary the rate of fluid pumped by impeller 43. In this embodiment a drive shaft 300 is connected to a constant speed motor, not shown, which corresponds to motor 275 illustrated in Figure 8. Shaft 300 is provided with a hollow portion at its lower end adapted to receive the upper end of a second shaft 301. A key 302 is rigidly attached to the inner surface of the lower portion of shaft 300 to engage a corresponding slot in shaft 301. In this manner shaft 301 rotates with shaft 300 but is free to move relative to shaft 300 in a direction along the common axes of the two shafts. A pair of spaced flanges 305 and 306 are attached to shaft 301 and a plate 307 is disposed between these two flanges. Plate 307 is mounted for slidable movement in a vertical direction along a rigid support rod 309 and engages a threaded rod 310 which is mechanically connected to motor 121 for rotation therewith. Rotation of rod 310 moves plate 307 up or down on support rod 309, which in turn moves shaft 301 up or down with respect to shaft 300. The lower portion of shaft 301 is enclosed within a support sleeve 311 and the lower end of shaft 301 is connected to an impeller hub 312 having an upper flat surface. A plurality of impeller blades 314 are attached to respective cam members 315 which are disposed between hub 312 and an annular facing member 316 which engages the bottom side of sleeve 311 through a thrust bearing 317. Cams 315 are connected to shaft 301 by suitable connecting pins 320, each of which is rigidly connected to its respective cam member and which is provided with a flanged end 321 fitted within a corresponding opening in shaft 301. Thus, impeller blades 314 turn with shaft 301 while cam members 315 are permitted to rotate about the axis of pins 320. Cam members 315 are provided with compression springs 323 which tend to orient the cam members in a vertical position. Movement of shaft 301 upward or downward with respect to sleeve 311 thereby serves to vary the pitch of impeller blades 314 and the quantity of fluid pumped by the impeller. This vertical movement of shaft 301 results from rotation of shaft 310 in response to a voltage signal from the thermocouple unit as applied through motor 121 as previously described.

In the embodiment illustrated in Figures 9 and 10 the quantity of liquid passed through the impeller flow path is telemetered to the surface by an oscillator corresponding to the unit illustrated in Figure 7. Unit 247 is replaced, however, by a conventional inductor and capacitor 246 is replaced by a variable capacitor 320 which is adjusted by rotation of rod 310. Adjustment of capacitor 320 thereby varies the frequency of output oscillations in accordance with the pitch of the impeller blades.

While this invention has been described in conjunction with present preferred embodiments thereof it should be apparent that the invention is not limited thereto.

What is claimed is:

1. Flow measuring apparatus to determine the rate of fluid flow between first and second spaced regions when there is a fluid pressure differential therebetween comprising, in combination, first and second conduit means each communicating between said first and second regions, a rotatable impeller disposed in said first conduit means, means coupled to said impeller to cause rotation thereof, flow responsive means disposed in said second conduit means, means responsive to said flow responsive means to vary the speed of rotation of said impeller until there is a predetermined flow through said second conduit means, and means to measure the speed of rotation of said impeller which is representative of the rate of fluid flow through said first conduit means.

2. The combination in accordance with claim 1 wherein said flow indicating means comprises a heating element disposed in said second conduit means, a first thermocouple junction disposed downstream from said heating element, and a second thermocouple junction disposed upstream from said heating element, said first and second junctions being connected to provide a voltage representative of the temperature differential between the downstream and upstream sides of said heating element.

3. The combination in accordance with claim 2 wherein said means responsive to said flow indicating means comprises a polarity responsive magnetic amplifier, the input terminals of which are connected to the output of said thermocouple junctions, and a servo-motor energized by the output of said magnetic amplifier.

4. Flow measuring apparatus to determine the rate of fluid flow between first and second spaced regions when there is a fluid pressure differential therebetween comprising, in combination, first and second conduit means each communicating between said first and second regions, a rotatable impeller disposed in said first conduit means, means coupled to said impeller to cause rotation thereof, a heating element disposed in said second conduit means, a first thermocouple junction disposed downstream from said heating element, a second thermocouple junction disposed upstream from said heating element said first and second junctions being connected to respond to a temperature differential between the downstream and upstream sides of said heating element, a polarity responsive magnetic amplifier, the input terminals of which are connected to the output of said thermocouple junctions, a servo-motor connected to the output of said magnetic amplifier, said servo-motor being connected to said means for rotating said impeller for varying the speed of said impeller in response to the thermocouple output until there is zero flow through said second conduit means, and means to measure the speed of rotation of said impeller which is representative of the rate of fluid flow through said first conduit means.

5. The combination in accordance with claim 4 wherein said means for rotating said impeller comprises an electric motor supplied by a source of variable energy, and wherein said servo-motor is connected to said source of variable energy to vary the speed of rotation of said motor.

6. The combination in accordance with claim 4 wherein said means for rotating said impeller comprises a constant speed motor, and a variable speed coupling system connecting said motor to said impeller, and wherein said servo-motor is connected to said coupling system to vary the speed of said impeller.

7. Flow measuring apparatus to determine the rate of fluid flow between first and second isolated regions comprising, in combination, first and second conduit means each communicating between said first and second regions, a heating element disposed in one of said conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier, the input terminals of which are connected to the output of said thermocouple junctions, a servo-motor connected to the output of said magnetic amplifier, an impeller including a plurality of blades mounted on a rotatable shaft, said impeller being disposed in the other of said conduit means, means for rotating the impeller shaft at a constant speed, means responsive to the output signal from said amplifier to vary the pitch of said impeller blades until there is zero flow through said one conduit means, and means to measure the variance of said pitch to determine the rate of fluid flow through said other conduit means.

8. Flow measuring apparatus to determine flow rates of fluid passed through a bore hole comprising, in combination, an elongated casing adapted to be lowered into a bore hole, a cable attached to said casing for lowering said casing into a bore hole, said cable containing an electrical lead which is electrically insulated from fluid within the bore hole, a packing device attached externally of said casing to engage the wall of the bore hole to prevent fluid flow through said bore hole past said packer, first and second conduit means contained within said casing, each communicating with the bore hole on opposite sides of said packer, a rotatable impeller disposed in said first conduit means, an electric motor positioned within said casing for rotating said impeller, a heating element disposed in said second conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier positioned in said casing, the input terminals of which are connected to the output of said thermocouple junctions, means responsive to the output signal from said amplifier for adjusting the speed of said first-mentioned motor until there is zero flow through said second conduit means, and means coupled to said impeller to measure the speed of rotation thereof which is representative of the rate of fluid flow through said first conduit means.

9. Flow measuring apparatus to determine flow rates in a bore hole comprising, in combination, an elongated casing adapted to be lowered into a bore hole, a cable containing at least one electrical lead for lowering said casing into a bore hole, a packing device attached externally of said casing to engage the wall of the bore hole to prevent fluid flow past said packer, first and second conduit means contained within said casing, each communicating with the bore hole on opposite sides of said packer, a rotatable impeller disposed in said first conduit means, a constant speed electric motor positioned within said casing, a variable speed coupling system connecting said motor to said impeller, a heating element disposed in said second conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier, the input terminals of which are connected to the output of said thermocouple junctions, means responsive to the output signal from said amplifier for adjusting the coupling between said first-mentioned motor and said impeller to vary the speed of said impeller until there is zero flow through said second conduit means, and means to measure the speed of rotation of said impeller to determine the rate of fluid flow through said first conduit means.

10. The combination in accordance with claim 9 further comprising switching means positioned within said casing for reversing simultaneously the polarity of the input signal applied to said magnetic amplifier and the field supplied to the motor driving said impeller whereby said motor is rotated in opposite direction, and a sequence relay positioned within said casing for actuating said switching means, said sequence relay being operable from the surface of the bore hole over said lead.

11. Flow measuring apparatus to determine flow rates in a bore hole comprising, in combination, an elongated casing adapted to be lowered into a bore hole, a cable containing at least one electrical lead for lowering said casing into a bore hole, a packing device attached externally of said casing to engage the wall of the bore hole to prevent fluid flow past said packer, first and second conduit means contained within said casing, each communicating with the bore hole on opposite sides of said packer, an impeller including a plurality of blades mounted on a rotatable shaft, said impeller being disposed in said first conduit means, a constant speed motor positioned within said casing for rotating said impeller shaft at a constant speed, a heating element disposed in said second conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier, the input terminals of which are connected to the output of said thermocouple junctions, means responsive to the output signal from said amplifier to vary the pitch of said impeller blades until there is zero flow through said first conduit means, and means to measure the variance of said pitch to determine the rate of fluid flow through said second conduit means.

12. Apparatus to telemeter a frequency signal from a first location to a second location comprising, in combination; first means to generate electrical pulses of constant magnitude, the frequency of which is proportional to the frequency of said signal; second means energized by the output of said first means to integrate said pulses to establish a voltage, the magnitude of which is proportional to the frequency of said generated pulses; a variable frequency oscillator, said oscillator including a tuned circuit; and third means to vary the tuning of said circuit responsive to the magnitude of said integrated voltage whereby the frequency of said oscillator is proportional to the frequency of said signal.

13. Apparatus to telemeter a frequency signal from a first location to a second location comprising, in combination; first means to generate electrical pulses of constant magnitude, the frequency of which is proportional to the frequency of said signal; second means energized by the output of said first means to integrate said pulses to establish a voltage, the magnitude of which is proportional to the frequency of said generated pulses; a variable frequency oscillator, said oscillator including a tuned circuit, said tuned circuit including a variable inductance unit comprising a saturable reactor, one winding of which comprises the inductance of said tuned circuit; and third means to vary the magnetic flux in said reactor responsive to the magnitude of said integrated voltage whereby the frequency of said oscillator is proportional to the frequency of said signal.

14. The combination in accordance with claim 13 wherein said saturable reactor comprises a frame of magnetic material, a first winding on said frame, second and third series connected winding mounted on said frame, said second and third windings being mounted in opposition such that a variable current flow through said second and third windings induces zero voltage in said first winding, said second and third windings forming the inductance of said tuned circuit; and means to apply said integrated voltage across said first winding.

15. Apparatus to telemeter a frequency signal from a first location to a second location comprising, in combination; a one-shot multivibrator energized in accordance with the frequency of the signal being measured; a rectifier in the output circuit of said multivibrator; an integrating circuit energized by the output of said rectifier whereby the voltage across said integrating circuit is proportional in magnitude to the frequency of the signal being measured; a saturable reactor comprising a frame of magnetic material, a first winding on said frame, second and third series connected winding mounted on said frame, said second and third windings being mounted in opposition such that a variable current flow through said second and third windings induces zero voltage in said first winding; a variable frequency oscillator including a tuned circuit having a variable inductance therein, said variable inductance comprising the second and third windings on said frame; and means to apply the voltage across said integrating circuit across said first winding whereby the frequency of said oscillator is representative of the frequency of the signal being measured.

16. Flow measuring apparatus to determine flow rates of fluid passed through a bore hole comprising, in combination, an elongated casing adapted to be lowered into a bore hole, a cable attached to said casing for lowering said casing into a bore hole, said cable containing an electrical lead which is electrically insulated from fluid within the bore hole, a packing device attached externally of said casing to engage the wall of the bore hole to prevent fluid flow through said bore hole past said packer, first and second conduit means contained within said casing, each communicating with the bore hole on opposite sides of said packer, a rotatable impeller disposed in said first conduit means, an electric motor positioned within said casing for rotating said impeller, a heating element disposed in said second conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier positioned in said casing, the input terminals of which are connected to the output of said thermocouple junctions, means responsive to the output signal from said amplifier for adjusting the speed of said first-mentioned motor until there is zero flow through said second conduit means, means positioned within said casing to generate an electrical pulse of constant magnitude for each revolution of said impeller, means to integrate said pulses to establish a voltage of magnitude proportional to the frequency of said pulses, a variable frequency oscillator including a tuned circuit positioned in said casing, means to vary the tuning of said circuit responsive to the magnitude of said integrated voltage whereby the frequency of said oscillator is proportional to the frequency of said signal, means to transmit the output of said oscillator to the surface of the bore hole over said lead, and a frequency meter positioned at the surface to detect the frequency of said oscillations.

17. Flow measuring apparatus to determine flow rates in a bore hole comprising, in combination, an elongated casing adapted to be lowered into a bore hole, a cable containing at least one electrical lead for lowering said casing into a bore hole, a packing device attached externally of said casing to engage the wall of the bore hole to prevent fluid flow past said packer, first and second conduit means contained within said casing, each communicating with the bore hole on opposite sides of said packer, a rotatable impeller disposed in said first conduit means, a constant speed electric motor positioned within said casing, a variable speed coupling system connecting said motor to said impeller, a heating element disposed in said second conduit means, a first thermocouple junction disposed downstream from said heating element, a second thermocouple junction disposed upstream from said heating element, said first and second junctions being connected to respond to a temperature differential between the downstream and upstream sides of said heating element, a polarity responsive magnetic amplifier, the input terminals of which are connected to the output of said thermocouple junctions, means responsive to the output signal from said amplifier for adjusting the coupling between said first-mentioned motor and said impeller to vary the speed of said impeller until there is zero flow through said second conduit means, means positioned within said casing to generate an electrical pulse of constant magnitude for each revolution of said impeller, means to integrate said pulses to establish a voltage of magnitude proportional to the frequency of said pulses, a variable frequency oscillator including a tuned circuit, means to vary the tuning of said circuit responsive to the magnitude of said integrated voltage whereby the frequency of said oscillator is proportional to the frequency of said signal, means to transmit the output of said oscillator to the surface of the bore hole over said lead, and a frequency meter positioned at the surface to detect the frequency of said oscillations.

18. The combination in accordance with claim 11 wherein said means to measure the variance of said pitch comprises an oscillator positioned within said casing, said oscillator including a tuned circuit comprising an inductor and a variable capacitor, said capacitor being coupled to said means for varying the pitch of said impeller blades whereby the frequency of said oscillator is representative of the pitch of said blades, means to transmit the output of said oscillator to the surface of the bore hole over said lead, and a frequency meter positioned at the surface to detect the frequency of said oscillations.

References Cited in the file of this patent

UNITED STATES PATENTS

| | | |
|---|---|---|
| 2,420,013 | Rajchman | May 6, 1947 |
| 2,654,433 | Piety | Oct. 6, 1953 |